July 4, 1950 — J. P. PERRY — 2,514,206

ROTOR MOUNTING FOR HELICOPTERS

Filed May 11, 1948

INVENTOR
JULIAN P. PERRY
BY
ATTORNEYS

Patented July 4, 1950

2,514,206

UNITED STATES PATENT OFFICE 2,514,206

ROTOR MOUNTING FOR HELICOPTERS

Julian P. Perry, Furlong, Pa., assignor to The Firestone Tire & Rubber Company, Akron, Ohio, a corporation of Ohio Application May 11, 1948, Serial No. 26,255

5 Claims. (Cl. 244—17.11)

This invention relates to helicopter aircraft and is more particularly directed toward improvements in the construction of lifting rotor helicopters having torque-counteracting tail rotor means offset from the plane of rotation of the lifting rotor.

In single rotor helicopters which use a torque correcting tail rotor to produce a transverse thrust adapted to counteract the driving torque of the main lifting rotor, it has been customary to locate the torque rotor behind the lifting rotor and at an elevation such that its thrust axis lies close to the plane of rotation of the main rotor. By locating the tail rotor thrust approximately in the plane of the main rotor the transverse thrust of the tail rotor balances the torque reaction of the main rotor with practically no tendency to tilt the aircraft laterally because both the lateral component of force from the main rotor and the lateral force from the tail rotor are in the same plane.

In some instances, it is desirable to place the tail rotor in a plane lower than the plane of the lifting rotor. This may occur in cases where it is preferred to keep the overall height of the machine at a minimum. Therefore, the tail rotor may be located to provide only a small amount of ground clearance. In other instances it may be preferred to place the torque rotor means underneath the main rotor in order to take advantage of the more efficient thrust produced by cross-flow and thereby provide a shorter structure for the aircraft. In the latter instance the thrust developed by the tail rotor or rotors is greater than with normal construction since the radius has been reduced. The action of the tail rotor when located in a plane lower than the main rotor is such as to produce a lateral rolling moment causing the craft to fly in a somewhat laterally inclined attitude in order to develop balanced lateral moments and forces.

In a co-pending application of John E. McDonald, Serial No. 25,232, filed May 5, 1948, this general arrangement of helicopter having a torque-counteracting rotor located below the plane of the main rotor is illustrated, and means for counteracting the lateral rolling moment produced by the offset tail rotor thrust is disclosed. This involves the offsetting of center of the main rotor from the vertical plane of symmetry of the fuselage. The present invention also utilizes an offset location for the center of rotation of the main rotor, but in addition provides for an inclination of the axis of rotation of the main rotor. The inclusion of an inclination has additional advantages including structural and mechanical improvements.

By providing an inclination of the axis of rotation the normal plane of rotation of the rotor for a neutral position of the control swash-plate, and also a corresponding neutral position of the control stick if desired, will provide a lift vector directed along the axis of rotation. This lift vector will, therefore, have a vertical component parallel to the longitudinal vertical plane of symmetry of the fuselage and a side component perpendicular to the vertical. By proper inclination of the axis the rolling moment due to the transverse component may be made approximately equal to the value of the rolling moment due to the thrust of the torque-counteracting rotor during normal powered operation. With this construction then during normal operation, since the control swash member is rotating in a plane perpendicular to the axis of rotation, there will be substantially no cycling action in the plate control linkage. Thus, the mechanical motion in the linkage is reduced to a minimum, with resultant reduction in wear and vibration.

In addition, to produce the transverse force at the rotor hub with this configuration the control stick may be connected to the swash-plate mechanism so that the lateral stick position is in neutral when the swash member is perpendicular to the axis of rotation. For a given amount of angular movement in the lateral sense the swashplate will thus produce the maximum possible lateral control moments and the control stick range will be used most effectively.

A further advantage of the present arrangement is associated with the engine drive. With the engine unit supported in the center of the fuselage a more advantageous drive connection between the engine and the rotor unit may be provided. Normally, a pair of universal joints is used to transmit the power from the engine unit to the rotor unit. When the rotor axis is inclined according to the arrangement of the present invention the angularity through which the universal joints must drive may be kept small. This is of considerable importance, particularly where the space for supplying the driving connection between the rotor and the engine unit is limited.

How the various objects and advantages of the invention are attained will be clear from the following description of the drawing in which.

Figure 1:
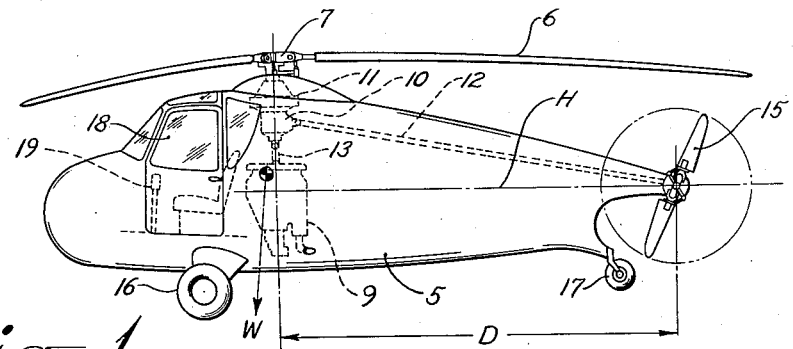
Figure 1 is a side elevational view of an aircraft incorporating the features of the present invention.

The helicopter illustrated in the drawing has a fuselage 5 which is supported during flight by rotor blades 6 attached to rotor hub 7. The rotor is supported in the fuselage by structure illustrated at 8. An engine 9 provides the power for driving the helicopter rotor and power from the engine is transmitted through the gear box unit 10 and the main reduction gear unit 11. A rotating axle member attached to hub 7 delivers the power to the rotor. Gearing for driving the tail rotor shaft 12 is included in the transmission unit 10. A short driveshaft 13 having universal joints 14 at each end connects the engine to the transmission unit 10.

In the helicopter illustrated the torque of the main rotor and the directional heading of the aircraft are controlled by the thrust of tail rotors 15. These tail rotor units are located one on either side of the fuselage below the outer portion of the main rotor blades 6. This arrangement of tail rotors has certain advantages in reducing the overall size of the aircraft and in reducing the relative power directed to the tail rotor units by utilizing the cross-flow from the main rotor. The particular arrangement of tail rotors is not intended to form part of the present invention per se since it is disclosed in the copending application of John E. McDonald, Serial No. 662,728, filed April 17, 1946. In a helicopter having the torque counteracting thrust located at a considerable distance below the plane of the main lifting rotor a large lateral rolling moment is introduced. The present invention involves an improved method of helping to reduce the undesirable effects of this lateral rolling moment.

The helicopter illustrated also incorporates main landing gear wheels 16 and tail wheel 17 to support the craft while at rest on the ground. The occupants' compartment 18 is in the forward portion of the fuselage. An operator's control stick 19 is illustrated and in Figure 2 it will be observed that the control stick 19 is shown in the neutral lateral position.

Figure 2:
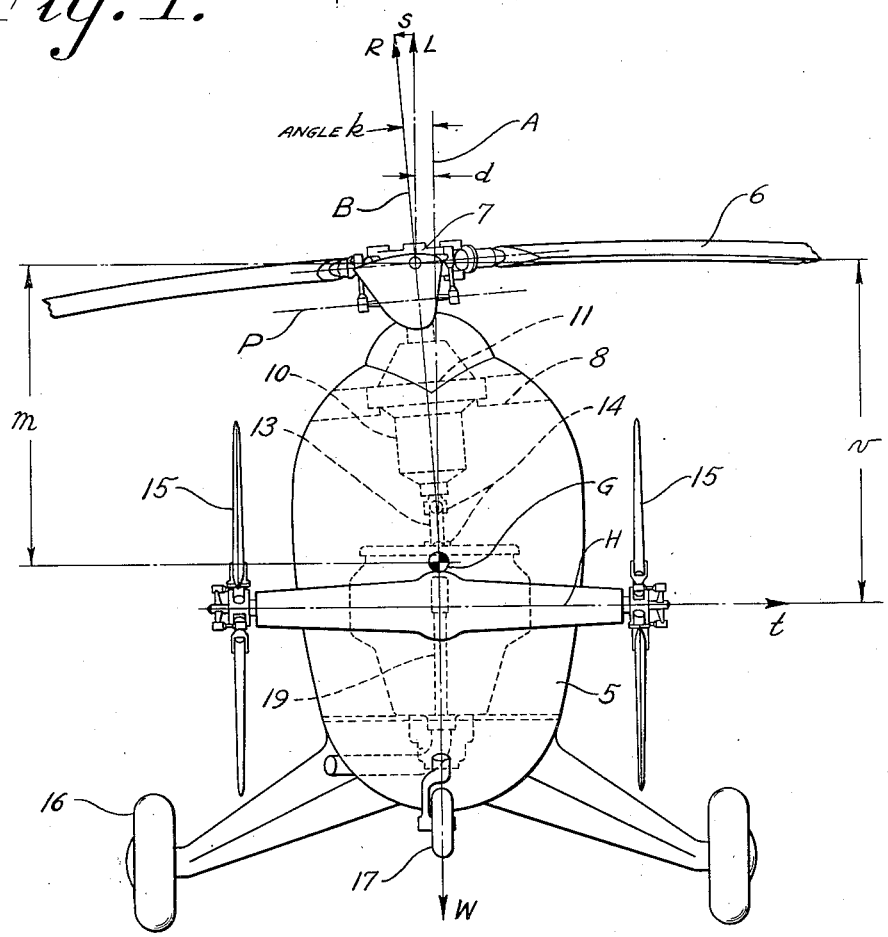
Figure 2 is a rear elevational view of the craft illustrated in Figure 1 to an enlarged scale.

Referring to Figure 2 it will be observed that the center of rotation of the rotor hub 7 is displaced laterally from the vertical center line of the craft A. Also, the axis of rotation B of the hub unit is inclined with respect to the vertical A. The inclination of the axis of rotation B is preferably such that a downward extension intersects a vertical plane through the center of gravity of the aircraft G at an elevation close to the center of gravity. With the arrangement of transmission units illustrated this is most easily accomplished by inclining the transmission units 10 and 11 and supporting them by suitable structure in this inclined position. The universal joints 14 permit drive between the engine and the transmission unit 10 through the angle. In some arrangements of helicopter transmission systems, the transmission units may be attached to the engine, in which case inclination of the complete system may be used.

In order to more clearly bring out the effect of the rolling moment produced by the tail rotor thrust and the manner in which the present invention assists in the counteraction of this effect, an example will be used. It is assumed that the aircraft illustrated has a gross weight of 3000 lbs. and a rotational speed for the main rotor of 230 R. P. M. If the engine power applied to the main rotor is 260 H. P. the torque reaction of the main rotor will be—

$$T = \frac{63,000 \text{ H.P.}}{\text{R.P.M.}} = \frac{(63,000)(260)}{230} = 71,200 \text{ lbs.-in.}$$

In Figure 1 the distance of the tail rotor from the center line of the main rotor is indicated as D. Therefore, the magnitude of the lateral thrust which the tail rotor units must develop to counteract the above torque if D=16 ft. will be—

$$t = \frac{71,200}{(16)(12)} = 371 \text{ lbs.}$$

During flight such as, for example, hovering without forward motion, a lateral force S equal to the tail rotor thrust $t$ must be developed at the main rotor in order to balance the force $t$ and thus prevent sidewise movement of the craft. Normally, with no inclination of the rotor axis, such a lateral force S would be developed by tilting the aircraft a sufficient amount to produce the required lateral component from the lift force. In the present arrangement, however, the rotor axis is tilted from its normal position with respect to the craft to produce at least a portion of the lateral force required. The rolling moment developed, due to the location of the horizontal plane H, in which the tail rotor thrust lies, a distance $v$ below the plane of the main rotor will be $tv$. Assuming the distance $v$ is 70 inches the rolling moment will therefore be—

$$M = (371)(70) = 26,000 \text{ lb.-in.}$$

In order to counteract this rolling moment and provide an equilibrium flight condition a lateral moment to counteract the tail rotor moment M must be developed. Assume the distance $d$, which represents the offset of the center of rotation of the rotor from the vertical plane A, is sufficient to provide the required counteracting moment. Then $M=Ld$ (lift L being equal to weight W). Since $Ld=tv$ then offset $$d = \frac{M}{W} = \frac{26,000}{3,000} = 8.68 \text{ in.}$$

It is preferable to provide only a portion of this correction usually varying from one-half to two-thirds this amount. In this way an average condition can be provided so that at full power operation such as during hovering there will be a slight angular inclination of the craft in one direction while at no-power operation such as during autorotational flight when the tail rotor thrust is reduced at zero, there will be a slight inclination of the aircraft in the opposite direction. During normal power operation of the rotor, for example during cruising, the power applied to the main rotor is usually reduced somewhat so that the maximum lateral moment is not developed by the tail rotor. Under these conditions of operation the angular attitude assumed by the craft will be very small and in some instances may be truly vertical.

For the present example, assume that the offset $d$ is selected to give approximately fifty per cent. of correction under maximum power. Then $d$ will be $$\frac{8.68}{2} = 4.34 \text{ in.}$$

If the vertical distance between the center of gravity G and the center of the rotor hub is $m$, the sine of the angle $k$ will be $$\frac{d}{m}$$

The lateral inclination will, therefore, be angle $k=$ $$\sin^{-1}\frac{d}{m} = \sin^{-1}\frac{4.34}{68} = 3°-40' \ (m=68 \text{ in.})$$

With this inclination of the rotational axis the maximum angularity which the aircraft will assume due to the displaced location of the tail rotor thrust $t$ will be 3°-40' instead of twice this amount which would be present if no corrective displacement of the rotor axis were made. During normal operation when only partial power is applied the angular attitude may be only approximately 1°, which amount would not be noticed by the occupants. The attitude in landing is also greatly improved so that one wheel does not engage the ground appreciably before the other.

It will be noted in Figure 2 that the plane of the swash plate P is located perpendicular to the rotational axis B. As is well known the control of helicopter rotors of this nature is usually accomplished through the medium of pitch change of the rotor blades. For lateral control purposes the rotor blade pitch is cycled in a fashion to produce the necessary inclination of the lift vector to give a lateral rolling moment. Lateral movement of the control stick provides for proper cycling action to give a corresponding lateral control moment. Movement of the control stick to the left causes inclination of the vector R to the left and vice versa.

In the present arrangement the cycling action is controlled through the medium of the swash plate P which in neutral position is located so as to be perpendicular to the axis B, the neutral position of the control stick being as illustrated in Figure 2. Thus lateral displacements of the stick from the position illustrated cause lateral inclination of the lift vector from the line B. The exact azimuth in which tilting of the swash plate occurs for lateral control depends upon the particular geometry of the pitch control linkage. Actually for a control to the left the blade pitch will receive maximum increase approximately at the aft position and maximum decrease at the forward position when normal flapping blades are used. With this control stick and swash plate relationship cycling action of the blades is reduced to a minimum because proper inclination of the rotor vector is automatically provided including the corrective moment action with the control stick in neutral. The full lateral motion of the stick may, therefore, be applied effectively to control motion rather than a portion of it being diverted for adjustment purposes to take care of corrective action for the tail rotor offset.

The magnitude of the tail rotor thrust may be controlled through the medium of pitch control mechanism at the tail rotor blades. This is preferably connected with the operator's rudder pedals to provide for directional control of the aircraft in the normal fashion.

My improved construction, which combines offsetting the center of rotation of the main lifting rotor and tilting of the rotational axis in a manner to cause the downward extension of the axis to pass close to the center of gravity, provides an effective means for counteracting the lateral tilting effect produced by torque counteracting thrust which is located below the plane of the main rotor. The inclination of the axis provides for simple installation both structurally and mechanically. The angularity involved in the mechanical drive is kept to a minimum by this construction. Improved control effectiveness and reduced mechanical cycling are further obvious advantages of this improved construction.

I claim:

1. In a helicopter aircraft having a power-driven main lifting rotor a hub, blades carried by said hub, and pitch-control means for cyclically adjusting said blades about their longitudinal axes for feathering, a fuselage supported below said lifting rotor, a torque-correcting tail rotor mounted at the rear end of said fuselage on a transverse axis at an elevation appreciably below the plane of the main rotor, said main rotor being located unsymmetrically with respect to the longitudinal vertical plane of symmetry of said fuselage, the center of said main rotor being offset laterally from said plane in a direction to oppose the rolling moment due to the location of said tail rotor below the main rotor and the axis of rotation of said hub being inclined at a fixed angle with respect to said plane of symmetry.

2. A helicopter aircraft having lifting rotor located generally above the center of gravity of the craft, said rotor comprising a hub, blades on said hub, and cyclic, pitch-control mechanism for adjusting said blades about their longitudinal axes for feathering a torque-counteracting tail rotor having its transverse thrust axis located to the rear of the center of said lifting rotor a distance at least approximately 75% of the radius of said lifting rotor and in a horizontal plane located closer to the center of gravity of said craft than to the plane of the lifting rotor, said hub having its axis of rotation inclined at a fixed angle with respect to the vertical longitudinal plane of symmetry through the center of gravity in a direction to oppose the rolling moment due to the location of said tail rotor in said horizontal plane, the inclination being such that the axis of rotation intersects said vertical plane close to the center of gravity.

3. For a helicopter, a fuselage, a main lifting rotor attached thereto, said rotor comprising a hub, blades on said hub, and pitch-control mechanism for cyclically adjusting said blades about their longitudinal axes for feathering torque correcting means having a transverse thrust axis attached at the rear end of said fuselage, the center of gravity of the helicopter being in a plane perpendicular to the lateral axis and laterally displaced from the center of rotation of said lifting rotor and the rotational axis of said hub being inclined at a fixed angle with respect to said plane, the thrust axis of the torque correcting means being located closer to a horizontal plane through the center of gravity than to the plane of the main rotor, the inclination of the rotational axis of the main lifting rotor being so directed that the rolling moment due to such inclination occurs in a sense opposed to the rolling moment due to the relative positions of the plane of the main rotor and the thrust of the torque correcting rotor relative to said horizontal plane.

4. A helicopter having a fuselage, a main lifting rotor, the center of gravity of the helicopter being generally below the center of the lifting rotor, said rotor comprising a hub, blades on said hub, and pitch-control mechanism for cyclically adjusting said blades about their longitudinal axes for feathering thrust means for counteracting the torque of said main rotor, said means being connected to said fuselage in a fashion to provide for a transverse thrust at an elevation close to a horizontal plane through the center of gravity, the axis of rotation of said hub being inclined at a fixed angle with respect to the vertical longitudinal plane of symmetry through the center of gravity in a direction to oppose the rolling moment due to the transverse thrust of said thrust means, the point of intersection of the axis of rotation and the vertical plane being below the plane of the lifting rotor.

5. A helicopter having a main lifting rotor, said rotor comprising a hub, blades on said hub, and pitch-control mechanism for cyclically adjusting said blades about their longitudinal axes for feathering a fuselage to which said rotor is attached, rotor torque counteracting means having a transverse thrust axis supported on said fuselage below the plane of said rotor, the center of gravity of said helicopter being located generally below the center of said rotor, the axis of rotation of said hub being inclined at a fixed angle with respect to the vertical longitudinal plane of symmetry through the center of gravity in a direction to oppose the rolling moment due to the location of said rotor torque counteracting means below the plane of the main rotor, the axis of rotation intersecting the vertical plane close to the elevation of the center of gravity.

JULIAN P. PERRY.

REFERENCES CITED

The following references are of record in the file of this patent:

UNITED STATES PATENTS

| Number | Name | Date |
| --- | --- | --- |
| 1,982,968 | Stalker | Dec. 4, 1934 |
| 2,318,259 | Sikorsky | May 4, 1943 |
| 2,369,652 | Avery | Feb. 20, 1945 |